2,798,890

MANUFACTURE OF AROMATICS

Hein Israel Waterman, Delft, Jan Willem Klinkenberg, Vlaardingen, and Jan Marinus Oelderik, Delft, Netherlands, assignors to Shell Development Company, New York, N. Y., a corporation of Delaware No Drawing. Application February 18, 1955, Serial No. 489,264

Claims priority, application Netherlands February 25, 1954

3 Claims. (Cl. 260—673)

The present invention relates to a process for the manufacture of aromatics, and particularly to a process of manufacturing higher boiling aromatics by the catalytic polymerization and dehydroaromatization of certain lower boiling olefins.

It has been known to polymerize lower boiling olefins with polymerization catalysts such as heteropoly acid catalysts, the principal products being higher boiling olefins, but such a process has heretofore not been applicable to the manufacture of aromatics. It has also been known to manufacture a gasoline fraction by reacting lower boiling olefins in the presence of polymerization catalysts such as phosphoric acid, but in this process it has often been necessary to carry out the reaction also in the presence of dehydrogenation catalysts such as elemental nickel or nickel oxide in order to obtain aromatics in the product.

The principal object of the present invention is to provide an improved process for the manufacture of aromatics from normally gaseous olefins. A further object is to provide an improved process for the manufacture of aromatics boiling above the gasoline boiling range but below the lubricating oil boiling range from straight-chain olefin of from 3 to 4 carbon atoms per molecule. Still another object of the invention is to provide an improved process for the polymerization of such olefins in the presence of a heteropoly acid or acid salt thereof whereby higher boiling aromatics are produced. Other objects will be readily apparent from the description and discussion of the invention.

It has now been discovered that aromatics boiling above the gasoline boiling range can be manufactured in high yields by the polymerization and dehydroaromatization of straight-chain olefins containing from three to four carbon atoms per molecule in the presence of an acidic catalyst of a heteropoly acid, such as a heteropoly acid or acid salt thereof, under particular and critical conditions of temperature and pressure. The product of the process of the present invention and/or aromatic fractions which can be separated therefrom are suitable as solvents, as starting materials for the manufacture of detergents by sulfonation, as starting materials for the manufacture of plastics, particularly synthetic textiles, and for many other uses.

The objects of the invention are accomplished by heating straight chain olefins containing from 3 to 4 carbon atoms per molecule, that is, propene, normal butenes or mixtures thereof, to a temperature of above 200° C. up to about 350° C., under a total pressure of at least 10 atmospheres absolute, in the presence of a heteropoly acid or acid salt thereof. No other catalytic agent is necessary.

The above specified temperature and pressure ranges are essential to the process. If either the temperature is not greater than 200° C. or the pressure is below 10 atmospheres, aromatics in the boiling range between gasoline and lubricating oil will not be obtained in the desired substantial degree. Higher temperatures result in greater yields of aromatics, but if the temperature is above 350° C., the heteropoly acid or salt thereof will decompose. A high yield of aromatics together with a long catalyst life will be obtained especially in the temperature range from about 220 to 300° C., and a particularly preferred temperature is about 250° C.

Propene and normal butenes can also be polymerized by the process of the invention in the presence of minor proportions of other gases and also in the presence of substantial or even preponderant amounts of paraffin diluents such as propane or pentane, as will be further described below. The total operating pressure in such cases should be at least 10 atmospheres absolute, but the partial pressure of the above-defined olefins in such mixtures can be below 10 atmospheres. In general, increasing the operating pressure increases the yield of aromatics. Particularly effective operating pressures are in the range of 15 to 200 atmospheres.

Examples of heteropoly acids suitable for the practice of the invention are phospho-tungstic acid, phospho-molybdic acid, chromo-molybdic acid, phospho-tungstic-molybdic acid, phospho-vanadic acid, silico-tungstic acid, silico-molybdic acid, arseno-molybdic acid and boron-tungstic acid. Acid salts of these heteropoly acids are also suitable for use as catalysts for the present reaction, such as, for example, the chromium, beryllium, zinc, cobalt, aluminum, titanium, nickel, iron, sodium, barium, copper, mercury, arsenic, and lead salts of the above heteropoly acids.

The presence of a solid carrier for the catalyst and the nature of this carrier also greatly affect the course of the reaction. The aromatic yield can be considerably increased and even doubled by the presence of a carrier. Suitable carriers are silica gel, natural or synthetic alumina, aluminum silicate and pumice. Silica gel generally gives the highest yields. Oxides of silicon and aluminum are the preferred carriers. The weight ratio of catalyst to carrier is of importance. Weight ratios of catalyst to carrier between 10:90 and 50:50 are generally preferred. It is necessary for the carriers to be substantially free from alkaline components of the silicates, aluminates, or the like, from which they are prepared. Consequently, commercial silica gel or alumina should be pre-treated with acid, preferably diluted mineral acid. Also where the carriers are other synthetic or natural products a pretreatment of the carrier with diluted acid often results in greater yields.

If during the reaction minor proportions of other lower boiling olefins are present in addition to the propene, butene or mixtures thereof, these also take part in the reaction.

The reaction may be carried out either batchwise or continuously. In the case of a continuous process, suitable space velocities are from 1 to 10 liters of feed (liquified basis) per liter of catalyst bulk volume per hour, but depending upon economic considerations higher or lower space velocities can be used. Generally, a space velocity sufficiently low to produce an olefin conversion of at least 30% will be desirable.

The practice of the invention is illustrated by the following example:

Example

The starting material was 98% pure propene plus minor quantities of other constituents which had no significant effect on the reaction.

Silico-tungstic acid was used as catalyst; it was prepared according to the method described in "Inorganic Syntheses," vol. I, H. S. Booth, Editor, page 129, New York, McGraw-Hill Book Co., Inc., 1939.

Silica gel was used as a carrier. Before being used the gel was treated with 4 N HCl for three hours at ordinary temperature and then held at 150° C. for twenty-four hours.

The catalyst was applied to the carrier in the following manner: 1 part by weight of silico-tungstic acid was dissolved in a small amount of water and 4 parts by weight of silica gel was submerged in this solution. The water was evaporated while the mixture was stirred at intervals. Finally the mixture was dried for 16 hours at a temperature of 110° C.–120° C. (Suitable drying temperatures lie between 110° C. and 300° C.)

The experiments were carried out in a rotating autoclave with a capacity of 2 liters. 100 grams of the mixture of the catalyst and silica gel were introduced therein. The autoclave was then evacuated to a pressure of 20 mm. Hg and subsequently filled with propene to saturation pressure at 15° C. (about 130 lbs./sq. in. absolute). The temperature was raised to 250° C. in the course of one hour. This temperature was then maintained for one hour. The propene was completely converted into a liquid product under these conditions.

The liquid product was fractionated by distillation. Distillation was first carried out at atmospheric pressure by means of a rectifying column, 120 cm. in height, which was filled with glass beads. The residue boiling above the boiling range of gasoline was passed into a Claisen flask provided with a Vigreux column, 15 cm. in height, and distilled in vacuo.

The physical properties of these fractions, as set forth in the table below, show that they consisted to a large extent of aromatics:

| Boiling range in ° C. | Percent by volume of total liquid product | $n_D^{20}$ |
| --- | --- | --- |
| 130° C.–170° C./13 mm | 11.3 | 1.4743 |
| 170° C.–200° C./13 mm | 8.1 | 1.4972 |
| Higher than 200° C./13 mm | 11.1 | 1.5242 |

It has been found that the useful life of the heteropoly acid catalysts in the process of the invention can be considerably extended when the olefin feed is diluted with a substantial proportion of a paraffin hydrocarbon, either a single compound or a mixture of such compounds. Lower boiling members of this class are preferred, especially those containing from 4 to 8 carbon atoms. Pentane is a particularly advantageous diluent. Such diluents take no part or no significant part in the polymerization and aromatization reactions directly. However, they make possible a more precise temperature control of the highly exothermic polymerization reaction by preventing an excessively rapid temperature rise at the beginning of the reaction. They also extend the catalyst life. The reason for this effect may possibly be the elimination of side reactions whereby resins are formed in the surface of catalyst or possibly the avoidance of local "hot spots" in the catalyst whereby the catalyst is decomposed. For best results, the diluent should be from 50 to 80 mol percent of the feed mixture.

We claim as our invention:

1. A process for the manufacture of aromatics boiling between the boiling ranges of gasoline and lubricating oil which comprises contacting a straight chain olefin containing from 3 to 4 carbon atoms with a catalyst consisting of silico-tungstic acid supported on a solid carrier substantially free from alkaline components, the weight ratio of said silico-tungstic acid to said solid carrier being from 10:90 to 50:50, said contacting being carried out at a temperature between 220° C. and about 300° C. and at a total pressure of at least 10 atmospheres absolute.

2. A process according to claim 1, wherein the solid carrier is silica gel.

3. A process according to claim 1, wherein the straight chain olefin is propene.

References Cited in the file of this patent

UNITED STATES PATENTS

| | | |
| --- | --- | --- |
| 2,237,460 | Thompson | Apr. 18, 1941 |
| 2,301,966 | Michel | Nov. 17, 1942 |
| 2,446,619 | Stewart et al. | Aug. 10, 1948 |

OTHER REFERENCES

Hackh's Chemical Dictionary, 3d edition (1946), page 407. (Copy available in Patent Office Library.)

Emeleus et al.: Inorganic Chemistry, 2d edition (1952), pages 206–208. (Copy available in Patent Office Library.)